United States Patent [19]

Tusting

[11] Patent Number: 4,676,097
[45] Date of Patent: Jun. 30, 1987

[54] SUBMERSIBLE KNOTMETERS

[75] Inventor: Robert F. Tusting, Ft. Pierce, Fla.

[73] Assignee: Harbor Branch Oceanographic Institute, Inc., Ft. Pierce, Fla.

[21] Appl. No.: 784,932

[22] Filed: Oct. 7, 1985

[51] Int. Cl.$^4$ .............................................. G01C 21/10
[52] U.S. Cl. ..................................... 73/187; 324/167; 324/174
[58] Field of Search ..................... 73/187, 185, 861.79, 73/861.77, 861.81, 189; 324/167, 173, 174

[56] References Cited

U.S. PATENT DOCUMENTS 4,555,938  12/1985  Boucher et al. ...................... 73/187

Primary Examiner—Donald O. Woodiel
Attorney, Agent, or Firm—Carroll F. Palmer

[57] ABSTRACT

Rotary type knotmeters designed to detect relative motion between an underwater vehicle and the water in which it is submersed at relatively great depths comprise a vaned rotor external unit, an electronic counter/display internal unit, a multiplexing transmission line connecting the external unit to the internal unit and, preferably, a brake unit to stop rotation of the rotor unit when the knotmeter is not immersed in water. The external unit comprises a plurality of spaced Hall-effect magnetic sensors that function with bi-phase electronic detectors to modulate current flowing in the transmission line to power the external unit. Such detectors count the number of rotations per unit time of the vaned rotor which is proportional to the relative motion between vehicle and water. The current is demodulated in the internal unit to produce a velocity value which is then displayed as a digital speed reading.

11 Claims, 7 Drawing Figures

SUBMERSIBLE KNOTMETERS

BACKGROUND OF THE INVENTION

1. Field of the Invention

This invention relates to knotmeters. More particularly, it concerns rotary type knotmeters designed to detect relative motion between an underwater vehicle and the water in which it is submersed at relatively great depths.

2. Description of the Prior Art

In conducting oceanographic studies and for other reasons, there is a need for measuring the relative motion of deep-diving underwater vehicles (submersible) and the water in which they are submersed. Such relative motion may be, for example, the result of movement of the submersible through the water or, alternatively, the flow of the water past the stationary submersible. The speed values of such measurements are not large, e.g., in the range of 0.1 to 10 knots, so the measurements must be performed with high accuracy.

Historically, a variety of different types of knotmeters have been developed for use in measuring speed aboard underwater vehicles, e.g., pitot tubes, rotary vanes, drag devices, etc. The present invention employs rotary units in combination with accessory units to provide knotmeters for deep-depth submersibles that are highly accurate and reliable under submerged ambient conditions.

It is known that the form or shape of rotors for rotary type knotmeters may be varied as shown by the following U.S. patents:

Schulte, U.S. Pat. No. 2,127,847—1938
Maeder et al., U.S. Pat. No. 3,457,782—1969
Phillips, U.S. Pat. No. 3,754,441—1973.

Knotmeters employing the improvements of the present invention preferably use vaned rotors (see Schulte and Phillips), but they may use other rotor forms.

Rotary knotmeters can use a variety of means to connect the rotor to some display or recording unit. For example, such means may be mechanical linkages (see U.S. Pat. No. 1,894,211), A.C. generators (see U.S. Pat. No. 3,287,969), magnetic flux units (see U.S. Pat. Nos. 3,496,770 & 3,531,988), etc.

Knotmeters employing the improvements of the present invention preferably use Hall-effect sensors with a current-modulation, multiplexing approach to connect the knotmeter rotor to a counting/display unit. Use of Hall-effect devices, in general, as electronic control elements is well known (see U.S. Pat. No. 4,338,552), but such devices are used in unique combinations in accordance with the present invention.

OBJECTS

A principal object of the invention is the provision of rotary type knotmeters designed to detect relative motion between an underwater vehicle and the water in which it is submersed at relatively great depths.

Further objects include the provision of such knotmeters that:

1. Have automatic brake means to lock the rotor when the knotmeter is raised out of the water.
2. Are highly reliable and easily maintained.
3. Permit an external rotary unit to be positioned an arbitrarily long distance from a speed display unit.
4. Are capable of effective functioning under ambient conditions encountered at relatively great submerged depths, e.g., 1000 meters.

Other objects and further scope of applicability of the present invention will become apparent from the detailed description given hereinafter; it should be understood, however, that the detailed description, while indicating preferred embodiments of the invention, is given by way of illustration only, since various changes and modifications within the spirit and scope of the invention will become apparent to those skilled in the art from this detailed description.

SUMMARY OF THE INVENTION

The objects are accomplished in accordance with the invention by the provision of rotary type knotmeters that can detect velocity of flow of water in relative motion between an underwater vehicle and the water in which it is submersed. Such knotmeters are formed of a rotor containing an external unit, an electronic internal unit and a multiplexing transmission line connecting the external unit to the internal unit.

Basically, the external unit includes a vaned rotor mounted for rotation about an axis approximately normal to the axis of the flow of water passing the vehicle, a plurality of Hall-effect magnetic sensors equally spaced apart around the axis of rotation of the rotor, and a permanent magnet carried by the rotor for imposing cyclical magnetic flux on the spaced sensors as the magnet rotates across them.

The new devices also include means for connecting the transmission line to a source of current to provide power to the external and internal units. Also, there is means for modulating current passed in the transmission line with voltage pulses generated by the sensors upon rotation of the rotor. Advantageously, such means for modulating current is a part of the external unit and it includes a bi-phase electronic detector that is triggered at the instant the magnetic flux cycles pass through zero.

The indicated internal unit comprises electronic means to demodulate and count pulses in the current flowing in the transmission line and continuously convert such pulses into linear velocity values that are a functions of the number of the pulses per unit time. The internal unit also includes display means to display such velocity values.

Advantageously, the display means of the new knotmeters includes electronic digital display elements, preferably in the form of light emitting diodes and there is switch means to control the intensity of light emission of such diodes.

In the preferred embodiments of the new knotmeters, the external unit comprises means to automatically lock the rotor against rotation upon removal of the knotmeter from the water.

BRIEF DESCRIPTION OF THE DRAWINGS

A more complete understanding of the invention may be had by reference to the accompanying drawings in which.

DESCRIPTION OF THE PREFERRED EMBODIMENTS

Figure 1:
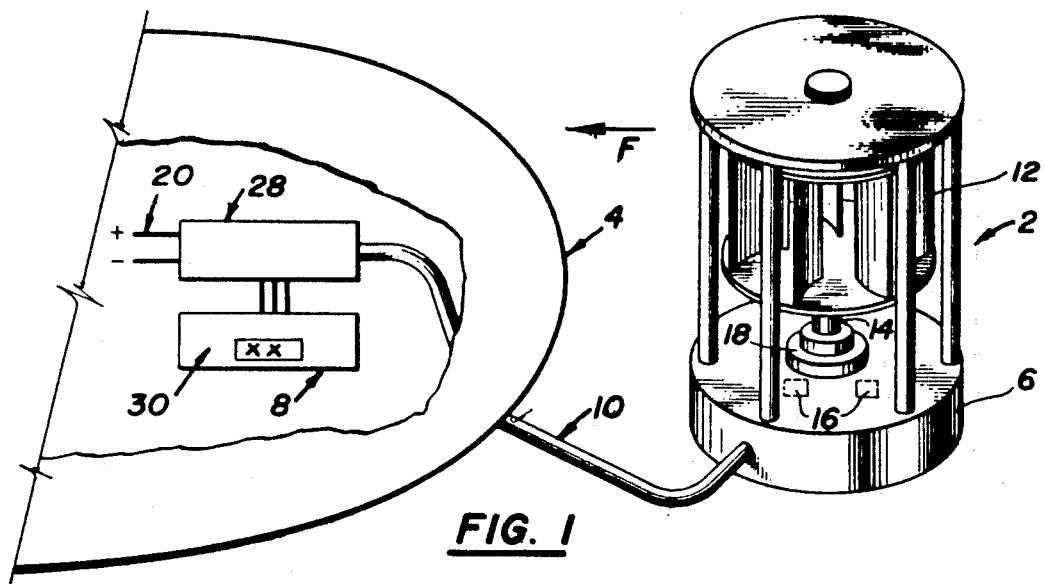
FIG. 1 is a diagrammatic view of a submersible knotmeter of the invention.
Figure 6:
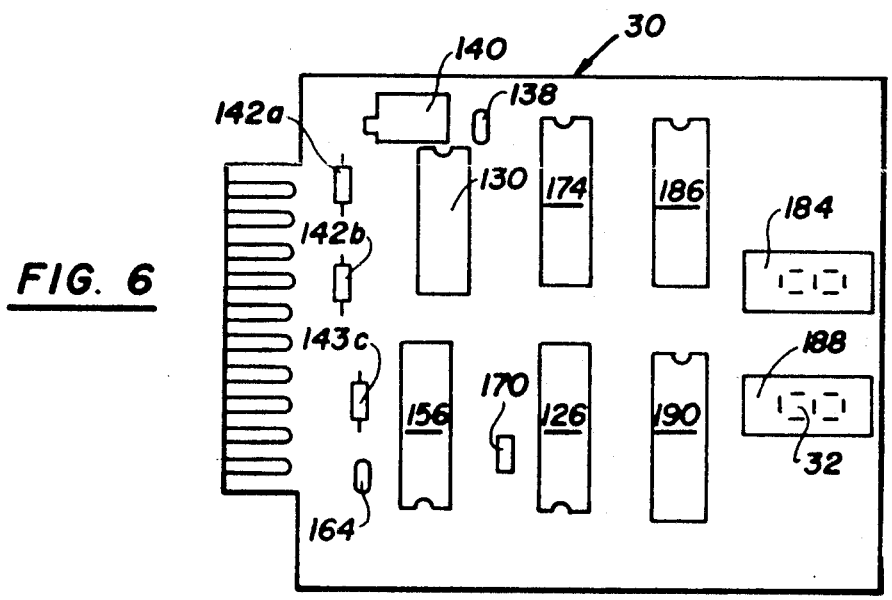
FIG. 6 is a plan view of a circuit board bearing the circuitry shown in FIG. 4.
Figure 7:
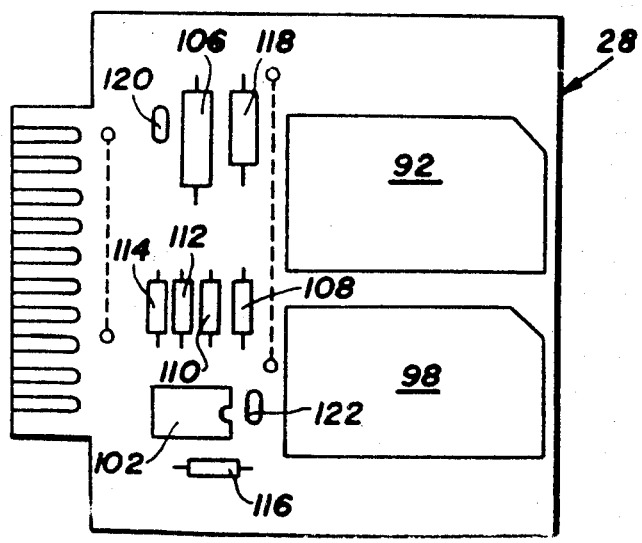
FIG. 7 is a plan view of a circuit board bearing the circuitry shown in FIG. 5.

Referring in detail to the drawings, in which identical parts are identically marked, a knotmeter 2 of the invention for use with a submersible vehicle 4 basically comprises a rotor containing external unit 6, an electronic internal unit 8 and a multiplexing transmission line 10 connecting the external unit 6 to the internal unit 8.

The external unit 6 includes a vaned rotor 12 mounted by shaft 14 for rotation about an axis approximately normal to the axis of the flow of water passing the vehicle as represented by the arrow F.

Unit 6 also includes a plurality of Hall-effect magnetic sensors 16 equally spaced apart around the axis of rotation of the rotor 12. In preferred embodiments, there are three sensors 16 positioned 120° apart circumferentially of the axis of the shaft 14.

There is a bipole, torodial permanent magnet 18 carried by the shaft 14 for imposing cyclical magnetic flux on the spaced sensors 16 as the magnet 18 rotates across the sensors 16. In alternative devices, the unit 6 may comprise a plurality of magnets 18 with single or multiple sensors 16.

Means 20 to connect the transmission line 10 to a source of current 22 to provide power to the external and internal units may include any suitable connectors, fuses, filters or like conventional elements (not shown).

An essential portion of the new devices is means 24 comprising an integrated circuit board 26 for providing dc/dc converted power supply and modulating current as it passes in the transmission line 10 with voltage pulses generated by the sensors 16 upon rotation of the rotor 12. Advantageously, such means 24 is a part of the external unit 6 and includes bi-phase electronic detector circuitry 26 that is triggered when the magnetic flux cycles, imposed on sensors 16 by magnet 18, pass through zero. Details of circuitry 26 are given below.

The internal unit 8 comprises electronic means 28 in the form of an integrated circuit (IC) board 29 to demodulate and count pulses in the current flowing in the transmission line 10 and continuously convert such pulses into linear velocity values that are a function of the number of the pulses per unit time.

The internal unit 8 also includes display means 30 as an IC board 31 to display such velocity values in the form of electronic digital display elements, preferably in the form of light emitting diodes (LED) 32 having switch means 34 to control the intensity of light emission of such diodes 32. As an alternative (not shown), the display means 30 may comprise liquid crystal display (LCD) elements with a separate illumination light source having switch means to control its intensity.

In preferred embodiments of the new knotmeters, the external unit 6 comprises lock means 36 to automatically prevent the rotor 12 from rotating upon removal of the knotmeter from immersion in water.

Figure 2:
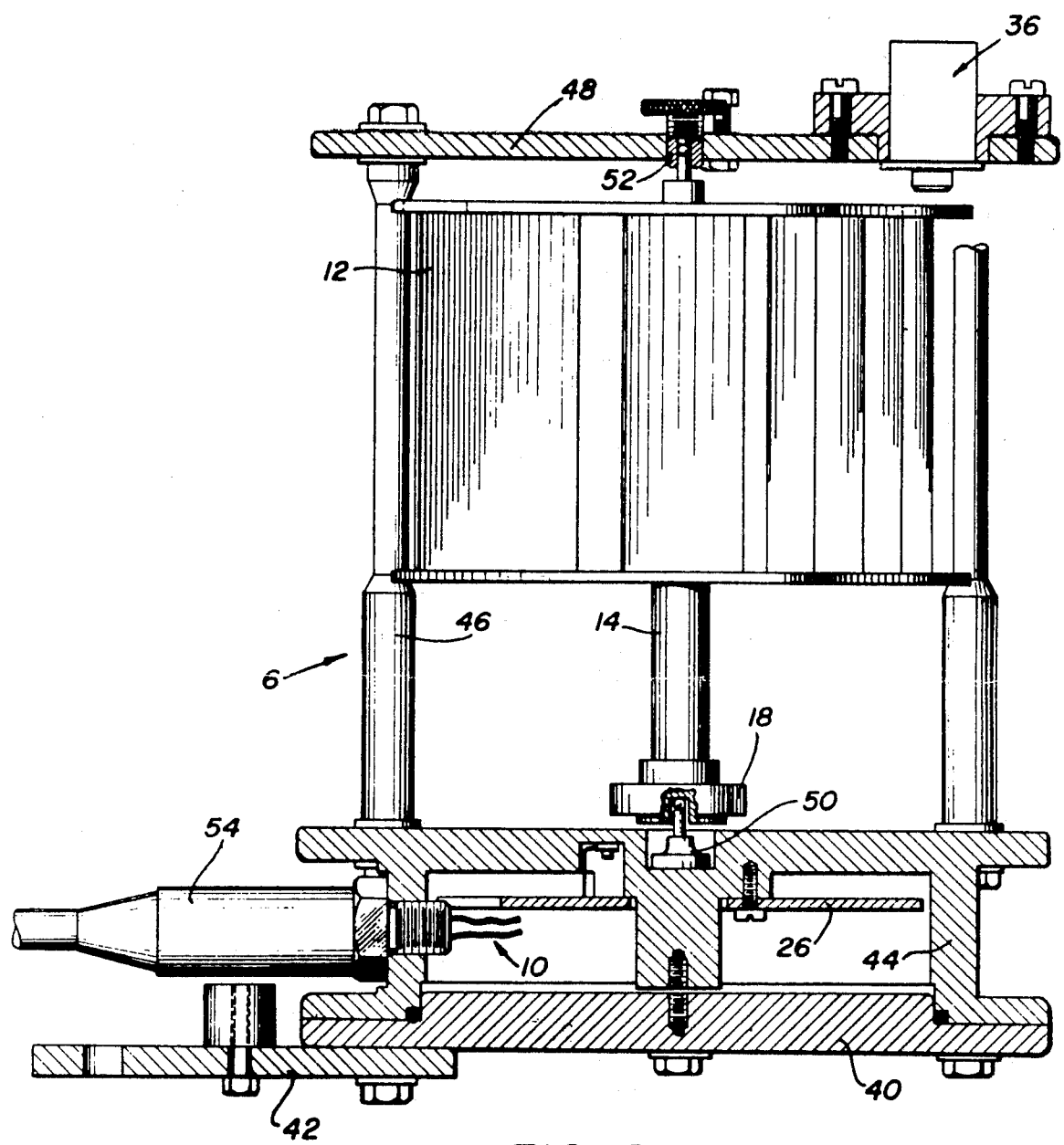
FIG. 2 is a lateral view of an external unit of a knotmeter of the invention.

The lock means 36 shown in FIG. 2 comprises a cylinder 37, that slides axially of the shaft 14 in a retainer member 38, has depending lug 39 that can enter holes (not shown) in the top of rotor 12 when the unit 6 is out of water and cylinder 37 is in its lowered position. However, the means 36 may assume other forms, e.g., the cylinder 37 may be replaced by a ball (not shown) positioned in a retainer member to float up into an unlocking position when unit 6 is in the water and fall into a locking groove in the top of rotor 12 when the unit 6 is out of water.

In the embodiment of FIG. 2, the external unit 6 comprises a base plate 40, by which it can be mounted on a portion 42 of a submersible 4, a base enclosure 44, spacer rods 46 and top plate 48. The shaft 14 is supported on bearings 50 and 52 and carries the opposed poled permanent magnet 18 spaced apart and above the sensors 16. The plates 40, 48 and the rods 46 form a rugged cage assembly which protects the rotor 12, but also disturbs the water flow around it. However, it has been found that the primary effect of the cage assembly is to slightly increase the stall speed of the rotor 12 and not to appreciably detract from the accuracy of flow velocity measurement. A typical external unit 6 will weigh about 1.5 kg. in air (0.86 kg in water) have a length of about 18 cm. and a diameter of about 13 cm.

The enclosure 44 contains the circuit board 26 and includes the insulated, pressure coupling 54 through which the transmission line 10 is admitted for connection to the board 26. The enclosure 44 is sealed by the O-ring 53 and can safely contain the circuitry 26 even at the great depth at which the unit is called upon to operate.

In the board circuitry 26, the sensors 16 connect via resistors 56 and leads 58, 60 to the paired IC logic inverters 62. Voltage pulses from the inverters pass via capacitors 64 to the resistors 66 and thence to the IC OR devices 68, 70 and 72. The output of lead 74 from the OR device 72, which is a rectangular wave voltage of 0–5 vdc, passes to the Darlington transistor 76 whose output is impressed via resistor 78 and lead 80 onto the current flowing in the transmission line 10 consisting of conductors 82, 84.

The circuitry 26 of means 24 also includes a IC voltage regulator 86 having a controlled 5 vdc output that is filtered through capacitors 88, 90. As a result, current flowing in the line 10 exhibits a rectangular wave form of voltage between 6.8 and 10.1 vdc. with a pulse width of about 0.6 millisecond. The pulse rate in this multiplexed transmission line 10 is directly proportional to the speed of rotation of the rotor 12 and shaft 14.

The sensors 16 are commercial IC devices comprising a Hall-effect sensor, an amplifier and a pulse sensor, e.g., bipolar Hall effect digital switches UGN 3035U marketed by Sprague Electric Co. of Concord, Mass., which provide constant amplitude output in their rated switching frequency range.

The internal unit electronic means 28 comprises IC power dc/dc converter 92 to receive 12 vdc current from a power source (not shown) via leads 94, 95 and deliver regulated 12 vdc current to leads 96, 97. Also, IC power converter 98 receives 12 vdc current from the same power source (not shown) via leads 94, 95 and delivers regulated 5 vdc current to leads 100, 101.

Figure 5:
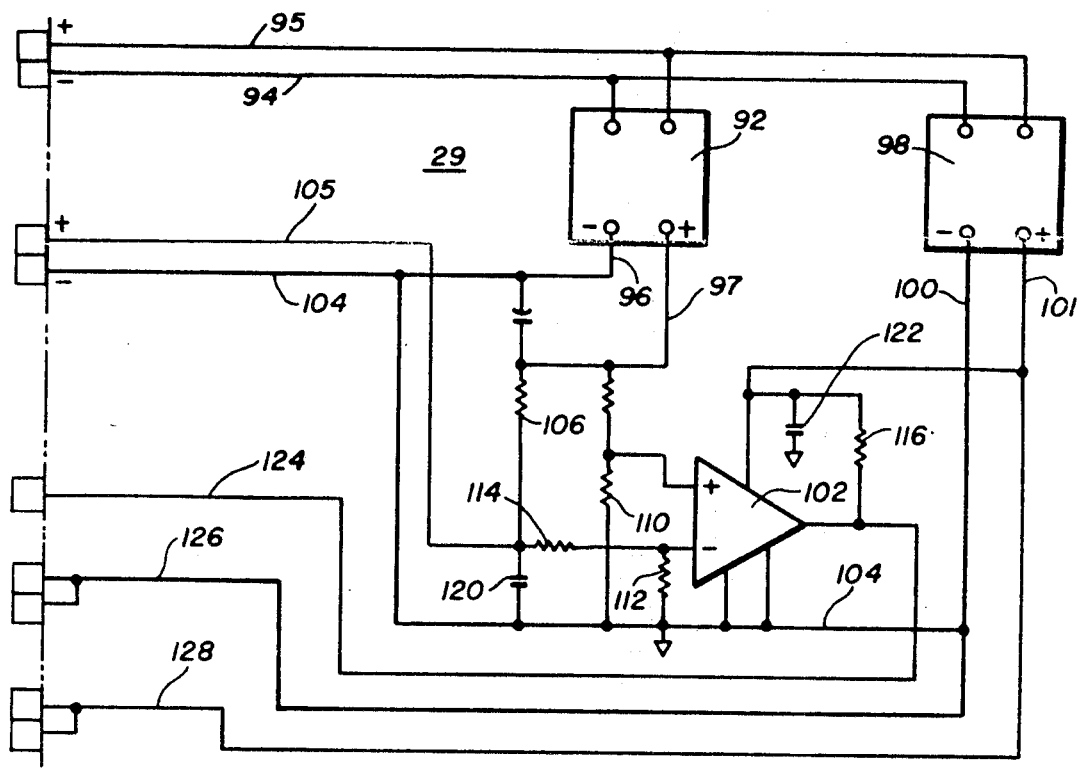
FIG. 5 is a schematic diagram of yet another electronic portion of the knotmeter of FIG. 1.
Figure 3:
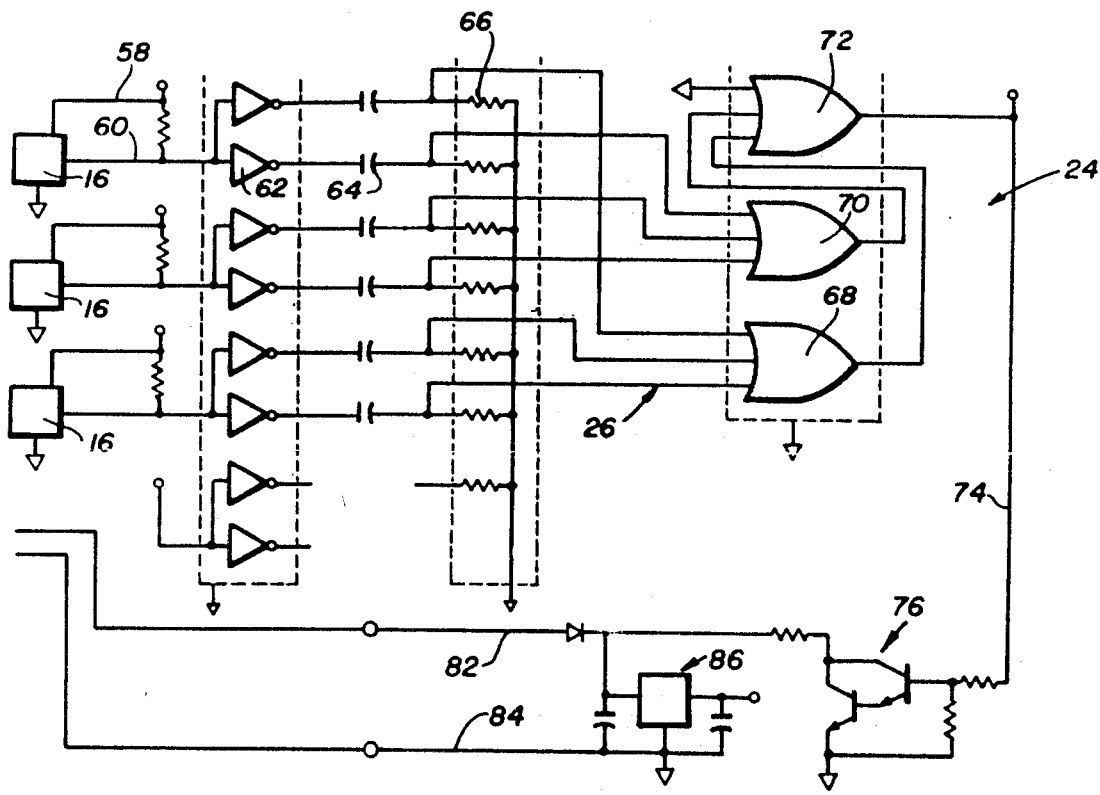
FIG. 3 is a schematic diagram of an electronic portion of the knotmeter of FIG. 1.
Figure 4:
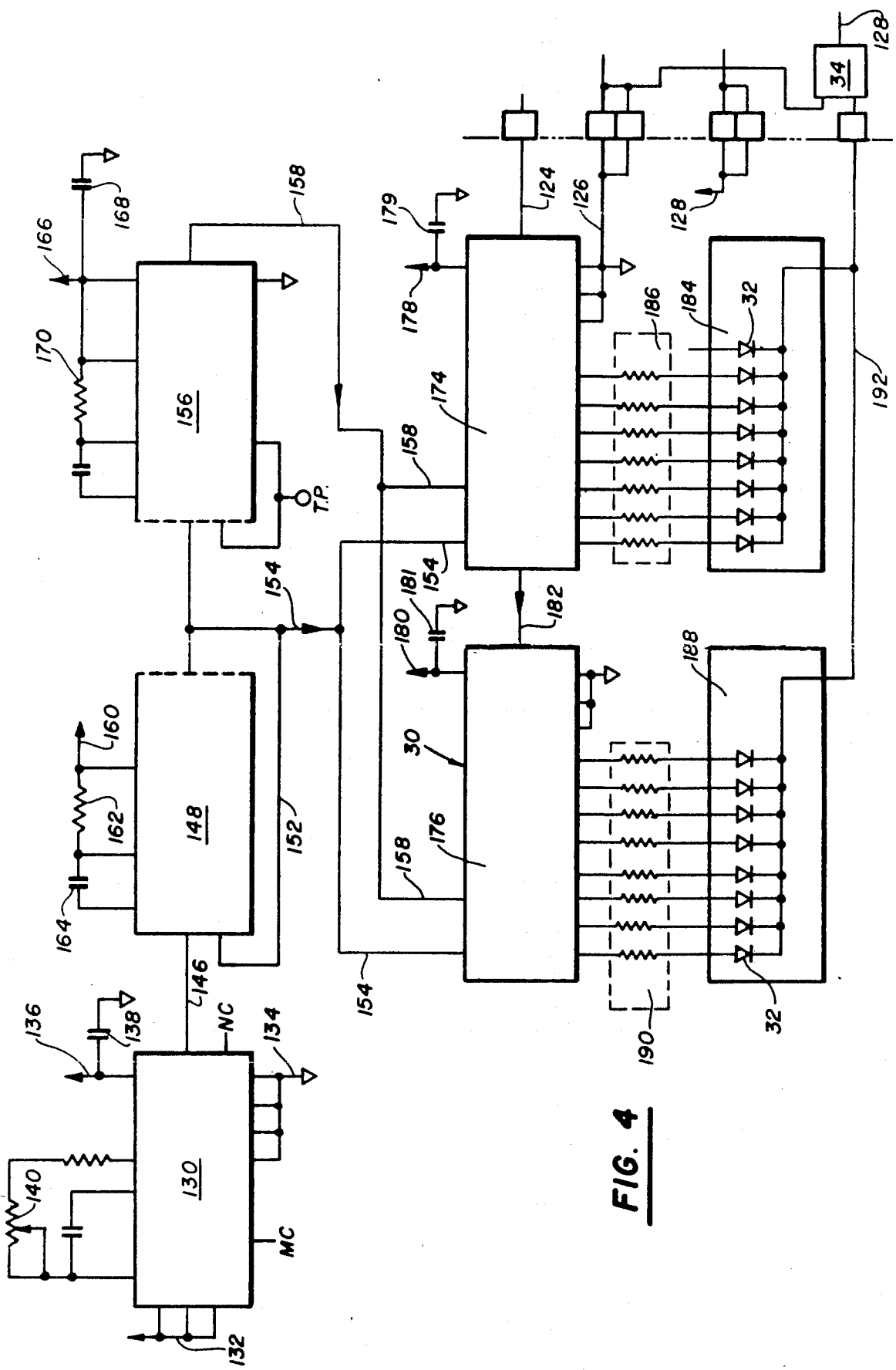
FIG. 4 is a schematic diagram of another electronic portion of the knotmeter of FIG. 1.

The means 28 also includes the IC comparator 102 which is connected via leads 104, 105 to the pulsed output of means 24 transmitted by line 10. The circuit board 29 also carries the resistors 106, 108, 110, 112, 114 and 116 plus the capacitors 118, 120 and 122 connected as shown in FIG. 5.

The pulsed output of IC comparator 102 exits via lead 124 and common lead 126 while 5 vdc current if carried from the converter 98 via leads 126 and 128.

The internal unit electronic circuitry 30 on board 31 comprises an IC oscillator clock 130 powered via leads 132, 134 connected to leads 128, 126 respectively with 5 vdc current. Lead 136, filtered to ground via capacitor 138, also connects to lead 128. Fine tuning of the oscillator 130 is made by the external circuit comprising variable resistor 140, ganged resistor 142, formed of series connected resistors 142a, 142b, 143c, and capacitor 144.

The output of oscillator 130 passes via lead 146 to the IC one-shot multivibrator first section 148 outputs via leads 150, 152 & 154 and the IC one-shot multivibrator second section 156 outputs via lead 158.

The multivibrator section 148 is powered with 5 vdc current via lead 160 coupled to the pulse-width determining resistor 162 and capacitor 164. Also, the multivibrator section 156 is powered with 5 vdc current via lead 160 filtered to ground via capacitor 168 and coupled to the pulse-width determining resistor 170 and capacitor 172.

The display means 30 comprises a pair of IC counter/drivers 174 and 176 which are powered, respectively, with 5 vdc current by lead 178 filtered to ground via capacitor 179 and lead 180 filtered to ground via capacitor 181. Signal imput from the means 28 enters IC unit 174 through lead 124 and enters IC unit 176 through lead 182 from unit 174.

The least significant digit display array 184 of LEDs 32 receives imput through ganged resistors 186 from IC unit 174. The most significant digit display array 188 receives imput through ganged resistors 190 from IC unit 176. Both LED arrays 184 & 188 receive +5 vdc current via lead 192 connected to switch 34 to control the intensity of the light emitted by the diodes 32.

OPERATION

The base plate 40 of the external unit 6 is mounted in a suitable position on the submersible 4 and the transmission line 10 connects unit 6 to the internal unit 8 via a pressure-tight entry in the submersible 4. Connection of the units 6 & 8 is made by means 20 to the power source 22, e.g., a plug connector on an instrument panel (not shown) of the submersible 4.

While the submersible 4 is out of the water, the lock means 36 prevents the rotor 12 of unit 6 from turning, but once the submersible enters the water, the means 36 automatically unlocks to enable rotor 12 to freely rotate.

Relative motion between the submersible 4 and the water (not shown) in which it is immersed is detected by measuring the magnet field below the magnet 18 and detecting the times when the field changes polarity (zero crossing detection) as the magnet passes over the sensors 16.

With the rotor 12 and magnet 18 assembly, there are two zero crossing transitions for each revolution (one + to − and one − to +). If the number of zero crossing is counted for a single sensor, the number of counts corresponding to a water speed of 0.1 knot would be one in each 4.076 second. To decrease the counting time, a plurality of magnets 18 may be used, or a plurality of sensors 16 may be used, or plural combinations of both. It has been found to be preferably to use one bipole magnet 18 and three sensors 16 spaced 120° apart, thereby reducing the counting time per 0.1 knot to 1.36 seconds.

The six pulses generated on each revolution of the shaft 14 by the sensors 16 are added (logically ORed), shaped and used by the circuitry means 24 to modulate the electrical supplied to the unit 6 by a 12 vdc supply via the transmission line 10. The modulation is detected by the comparator circuitry 28 and the number of pulses during a 1.36 second period is displayed by the two decimal digit readout supplied by display means 30. The display reads speed in knots, in the format X.X, with a maximum 9.9. In most cases, these knotmeters will normally be used up to five knots.

The operation of the new devices 2 is quite simple. The oscillator (clock) 130 with the one-shot multivibrators 148 and 156 starts a counting cycle every 1.36 seconds. The decade counters 174, 176 are first reset by the circuitry to zero and then count the number 0 pulses from the sensors 16 during the 1.36 sec. counting interval. At the end of that time, the number is transferred in the circuit to a register which, in turn through the resistors 186, 190 excites the LED displays 184, 188. A subsequent count cycle is then started; a reset pulse followed by a pulse counting period. During the counting interval, the displays 184, 188 retain the digits imposed during the previous cycle. Display brightness is controlled by the switch circuit 34.

The embodiments of the invention in which an exclusive property or privilege is claimed are defined as follows:

1. Rotary type knotmeters that can detect velocity of flow of water in relative motion between an underwater vehicle and the water in which it is submersed comprising:
   a rotor containing external unit,
   an electronic internal unit and
   a multiplexing transmission line connecting the external unit to the internal unit,
   said external unit including:
      a vaned rotor mounted for rotation about an axis approximately normal to the flow of water passing the vehicle,
      at least one Hall-effect magnetic sensor spaced around said axis of rotation, and
      at least one permanent magnet positioned to rotate with said rotor for imposing cyclical magnetic flux on said sensor as the magnet rotates across same,
   means for connecting said transmission line to a source of current to provide power to said external and internal units, and
   means for modulating current passing in said transmission line with pulses generated by said sensors upon rotation of said rotor,
   said internal unit comprising:
      electronic means to demodulate and count pulses in the current flow in said transmission line and continuously convert said pulses into a linear velocity values that are a function of the number of said pulses per unit time, and
      display means to display said values.

2. The knotmeter of claim 1 wherein said external unit comprises means to automatically lock said rotor against rotation upon removal of said knotmeter from immersion in water.

3. The knotmeter of claim 1 wherein said display means includes electronic digital display elements.

4. The knotmeter of claim 3 wherein said display elements are light emitting diodes and said display means includes switch means to control the intensity of light emission of said diodes.

5. The knotmeter of claim 1 wherein said means for modulating current is a part of said external unit.

6. The knotmeter of claim 5 wherein said means for modulating current includes a bi-phase electronic detector that is triggered by said magnetic flux cycles passing through zero.

7. Rotary knotmeters that can detect velocity of flow of water in relative motion between an underwater vehicle and the water in which it is submersed comprising:
   a rotor containing external unit,
   an electronic internal unit and
   a multiplexing transmission line connecting the external unit to the internal unit,
   said external unit including:
      a vaned rotor mounted for rotation about an axis approximately normal to the flow of water passing the vehicle,
      a plurality of Hall-effect magnetic sensors spaced apart around said axis of rotation,
      at least one permanent magnet positioned to rotate with said rotor for imposing cyclical magnetic flux on said sensors as the magnet rotates across them, and
      means to automatically lock said rotor against rotation when said external unit is not immersed in water,
   means for connecting said transmission line to a source of current to provide power to said external and internal units, and
   means for modulating current passing in said transmission line with pulses generated by said sensors upon rotation of said rotor,
   said internal unit comprising:
      electronic means to demodulate and count pulses in the current flow in said transmission line and continuously convert said pulses into a linear velocity values that are a function of the number of said pulses per unit time, and
      display means comprising a plurality of light emitting diodes to display said values.

8. Rotary type knotmeters that can detect velocity of flow of water in relative motion between an underwater vehicle and the water in which it is submersed comprising:
   a rotor containing external unit,
   an electronic internal unit, and
   electrical conduit means electrically connecting said external unit to said internal unit;
   said external unit including:
      a vaned rotor mounted for rotation about an axis approximately normal to the flow of water passing the vehicle,
      a plurality of Hall-effect magnetic sensors spaced apart concentric with said axis of rotation and in a plane normal to said axis, and
      a permanent magnet positioned to rotate with said rotor for imposing cyclical magnetic flux on said sensors as the magnet rotates relative thereto;
   said internal unit comprising:
      electronic means to count current pulses generated by said magnetic sensors upon rotation of said vaned rotor and continuously convert said pulses into linear velocity values that are a function of the number of said pulses per unit time, and
      display means to display said velocity values.

9. A knotmeter of claim 8 wherein said external unit comprises means to automatically lock said rotor against rotation upon removal of said knotmeter from immersion in water.

10. A knotmeter of claim 9 wherein said display means includes electronic digital elements.

11. A knotmeter of claim 10 wherein said display elements are light emitting diodes and said display means includes switch means to control the intensity of light emission of said diodes.

* * * * *